Patented May 27, 1952

2,598,654

UNITED STATES PATENT OFFICE 2,598,654

21-SUBSTITUTED THIOENOL ETHERS OF 20-OXO-PREGNANES AND 20-OXO-PREGNENES

Albert Wettstein and Charles Meystre, Basel, Switzerland, assignors to Ciba Pharmaceutical Products, Inc., Summit, N. J.

No Drawing. Application July 10, 1950, Serial No. 173,002. In Switzerland July 25, 1949

6 Claims. (Cl. 260—397.5)

The present invention relates to 21-substituted thioenol ethers of 20-oxo-pregnanes and 20-oxo-pregnenes, and to the preparation thereof.

The conversion of ketones into the corresponding enol ethers is a known reaction in steroid chemistry. Thus for example 3-, 7-, 12- or 20-oxo-pregnanes, as well as the corresponding pregnenes, which are unsubstituted in 21-position, can be converted without noteworthy difficulty into the corresponding enol ethers. However, it has not heretofore been possible to prepare the enol ethers of the 20-oxo-pregnanes which are substituted in the 21-position or of the 21-substituted 20-oxo-pregnenes.

A primary object of the present invention is the embodiment of enol ethers—and, more specifically, the thioenol ethers—of the aforesaid 21-substituted 20-oxo-pregnanes and pregnenes, and the development of a method for the preparation thereof.

As set forth in application, Ser. No. 173,001, filed on even date herewith, it has been found that by reacting a 21-substituted 20-oxo-pregnane or pregnene with a mercapto compound, more particularly an alkyl mercaptan, such as methyl mercaptan, ethyl mercaptan, benyl mercaptan and the like, in the presence of an acid catalyst, such for example as hydrochloric acid, sulfuric acid or toluene-sulfonic acid, the thioacetal (mercaptol) of the starting compound is produced. According to the present invention, the aforesaid object is realized by splitting off 1 mol of mercaptan from the said acyclic thioacetal, thereby converting the same into the corresponding thioenol ether. The chemistry of the pregnane compounds, in particular that of the suprarenal cortical hormones, is thus further enriched.

According to the present process the specified acyclic thioacetals may be treated with mercaptide-forming heavy metal derivatives, such as oxides or inorganic or organic salts, for example chlorides, nitrates, carbonates, acetates, propionates or benzoates of mercury, cadmium, silver, copper, lead, bismuth, cobalt or nickel. The reaction is suitably carried out with exclusion of water and, if desired, in the presence of organic or inorganic acid-binding agents, such for example as pyridine or collidine or carbonates such as alkali, alkaline earth or heavy metal carbonates. The conversion of the above mentioned acyclic thioacetals into the corresponding thioenol ethers can also be performed by thermal influence. The resultant thioenol ethers of 20-oxo-pregnanes and 20-oxo-pregnenes, such as thioenol alkyl ethers and thioenol aralkyl ethers, especialy thioenol methyl-, thioenal ethyl-, thioenol propyl-, thioenol butyl- or thioenol benzyl ethers are new compounds.

The pregnane-20-one-thioacetals, or the corresponding pregnene compounds, prepared according to the aforesaid application, Ser. No. 173,001 are substituted in the 21-position by a free or functionally converted hydroxyl group, for example an acyloxy group such as acetoxy, propionyloxy, benzoyloxy or tosyloxy group, or an alkoxy group such as a methoxy or ethoxy group, or by a halogen atom such as chlorine or bromine. They may also bear similar substituents or oxo groups in the 6-, 7-, 12- and in particular in the 3- and 11-positions, and they may bear epoxy groups, for example in the 3,9- and 16,17-positions. They can further have double bonds, for example in 3-, 4-, 5-, 11- and/or 16-position. Also corresponding isomeric pregnane derivatives, for example pentacyclic i-pregnane, 17-iso-pregnane or allo-pregnane compounds may be employed as starting materials.

The new products may be employed as therapeutic agents. They are however particularly valuable as intermediate products for the manufacture of therapeutically active compounds.

The following examples illustrate the invention the parts being by weight unless otherwise stated and the relationship of parts by weight to parts by volume being the same as that of the kilogram to the liter; the temperatures are in degrees centigrade.

*Example 1*

3 parts of $\Delta^5$-3,21-diacetoxy-pregnene-20-one are covered with 10 parts by volume of carbon tetrachloride and 3 parts by volume of ethyl mercaptan and stirred using a calcium chloride moisture seal. Thereupon at 0°, a slow stream of hydrogen chloride is passed over the liquid. After 2 hours stirring, the solution is concentrated in vacuum at 20°. The oily residue is taken up in ether, the ethereal solution washed with dilute sodium carbonate solution and water, dried and evaporated. The oily reaction product is the Δ⁵-3,21-diacetoxy-pregnane-20-one-diethyl-thioacetal of the formula

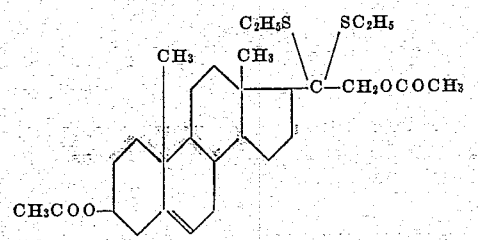

6 parts of the Δ⁵-3,21-diacetoxy-pregnene-20-diethyl-thioacetal obtainable according to the preceding paragraph, are boiled for 8 hours under reflux with 7 parts of mercuric chloride and 8 parts of cadmium carbonate in 50 parts by volume of dry ethanol using a calcium chloride moisture seal. Thereupon the whole is filtered with suction, the residue washed with acetone and the filtrate evaporated in vacuum. The residue thus obtained is extracted by boiling with ether, the insoluble salts filtered with suction and the ether evaporated in vacuum. For after-acetylation, the residue is now heated for 1 hour on the water bath with 3 parts by volume of pyridine and 6 parts by volume of acetic anhydride and the solution subsequently brought to dryness. The oil obtained is dissolved in ether and the ether solution washed with dilute hydrochloric acid, water, dilute sodium carbonate solution and water, dried and evaporated. The oily product is dissolved in methanol and the hot methanolic solution treated with carbon. From the filtered solution, there separates the Δ⁵-3,21-diacetoxy-pregnene-20-one-thioenol ethyl ether of the formula

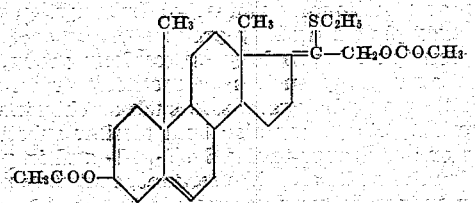

Recrystallized from methanol or hexane, it melts at 131–132°. By further recrystallization from pentane, the melting point rises to 150–158°.

By chromatography of the product in the mother liquors over aluminum oxide and evaporation of the eluate obtained with benzene-pentane or benzene, further quantities of the above thioenol ether are obtained. In an analogous manner Δ⁵-3,21-diacetoxy-pregnene-20-one-dibenzyl-thioacetal is converted into Δ⁵-3,21-diacetoxy-pregnene-20-one-thioenol benzyl ether.

*Example 2*

3 parts of Δ⁵-3,21-diacetoxy-pregnene-20-one-diethyl-thioacetal (see the first paragraph of Example 1) are heated on the water-bath for 4 hours together with 3 parts of mercuric chloride, 5 parts by volume of pyridine and 10 parts by volume of acetic anhydride. The solution is then evaporated in vacuum, and the residue shaken out several times with ether. The ethereal solutions are filtered and the filtrate brought to dryness. The oily residue is dissolved in hexane, the warm solution filtered with a small quantity of carbon and then allowed to cool, whereupon Δ⁵-3,21-diacetoxy-pregnene-20-one-thioenol ethyl ether of the formula

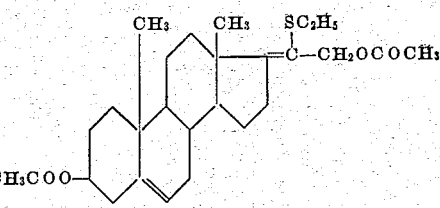

separates out in crystalline form. After recrystallization from hexane or ethyl alcohol, it melts at 90–92°. Upon further recrystallization from pentane, the melting point rises to 150–158°. By a chromatographic purification, additional quantities of the same thioenol ether can be obtained from the mother liquors.

*Example 3*

10 parts of Δ⁵-3,21-diacetoxy-pregnene-20-one-diethyl-thioacetal are heated for 4 hours on the water-bath together with 15 parts of mercuric chloride, 20 parts by volume of pyridine and 40 parts by volume of acetic anhydride. Following the addition of water, the solution is evaporated in vacuum, and the residue is again dissolved in 5 parts by volume of pyridine and 40 parts by volume of acetone. The solution is treated with hydrogen sulfide and the formed insoluble sulfide is filtered off. The clear solution is then evaporated in vacuum and the residue taken up in ether. The ethereal solution is washed with dilute hydrochloric acid, dilute sodium carbonate solution and water, then dried and evaporated. The oily residue yields, after crystallization from methanol, crystals which melt unsharply at 74–94°. These are treated, in hexane solution, with a small amount of active carbon and then chromatographed over aluminum oxide. The residue of the hexane and benzene fractions is recrystallized from ethanol and then from pentane, whereupon the melting point of the Δ⁵-3,21-diacetoxy-pregnene-20-one-thioenol ethyl ether of the formula.

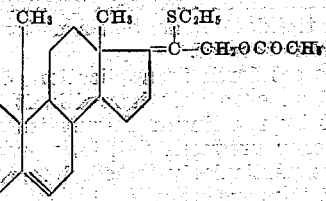

rises to 150–158°.

A small test specimen of the thus-obtained leaflets, dissolved in a small quantity of chloroform, gives a characteristic brown coloration with tetranitromethane, in contradistinction to the Δ⁵-3,21-diacetoxy-pregnene-20-one-diethyl-thioactal which turns yellow under the same conditions. The amorphous methanol mother liquors of the crystallizate also give the brown coloration with tetranitromethane which is typical for the thioenol ether and manifestly contain additional considerable quantities of thioenal ether.

*Example 4*

2.4 parts of Δ⁵-3,21-diacetoxy-pregnene-20-one-diethyl-thioacetal are heated for 2 hours on the water-bath with 2 parts of copper acetate in 25 parts of volume of acetic anhydride and 25 parts by volume of glacial acetic acid. The reaction mixture, after addition of water, is then evaporated in vacuum, and the residue dissolved in ether. The ethereal solution is washed with water, dilute sodium carbonate solution and again with water, and is then dried and evaporated. The residue is dissolved in hexane and the warm solution treated with active carbon. A quantity of Δ⁵-3,21-diacetoxy-pregnene-20-one crystallizes out of the cooled clear solution. The mother liquors contain the crude Δ⁵-3,21-diacetoxy-pregnene-20-one-thioenol ethyl ether, which can be purified as described in Example 3 and also gives the characteristic brown coloration with tetranitromethane mentioned in the said example.

*Example 5*

2 parts of 3,21-diacetoxy-allo-pregnane-20-one are covered with 5 parts by volume of ethyl mercaptan and 10 parts by volume of chloroform. Thereupon, at 20°, while stirring and while maintaining a calcium chloride moisture seal, a slow stream of hydrogen chloride is passed over the liquid. After 18 hours, the solution is concentrated in vacuum. The residue is taken up in ether, the ethereal solution is washed with dilute sodium carbonate solution and water dried and evaporated. The oil which remains behind contains the 3,21-diacetoxy-allo-pregnane-20-one-diethyl-thioacetal of the formula

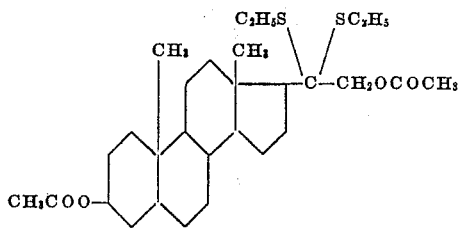

It may be directly used further, or may be converted into the pure oily thioacetal by chromatographic purification over the aluminum oxide.

2 parts of the pure 3,21-diacetoxy-allo-pregnane-20-one-diethyl-thioacetal obtained as described in the preceding paragraph are heated for 2 hours on the water-bath with 2 parts of mercuric chloride in 5 parts by volume of pyridine and 10 parts by volume of acetic anhydride. The solution is then cooled, diluted with ether and decanted from the precipitate. It is then evaporated in vacuum after addition of water, the residue taken up in ether, the ethereal solution washed with diulte hydrochloric acid and water, and then dried and evaporated. The residue is then chromatographed over 50 parts of aluminum oxide. The evaporated benzene-pentane fractions are recrystallized from methanol and finally from isopropyl ether, small leaflets which melt at 150–154° being obtained. This 3,21-diacetoxy-allo-pregnane-20-one-thioenol ethyl ether of the formula

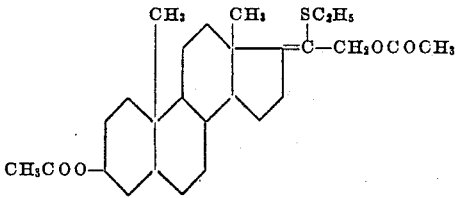

also gives, in solution in a small quantity of chloroform, the brown coloration with tetranitromethane which is typical for thioenol ethers. From the further benzene and ether eluates from the chromatography, a small quantity of 3,21-diacetoxy-allo-pregnane-20-one can be recovered.

*Example 6*

5 parts of 3,21-dihydroxy-12-acetoxy-pregnane-20-one are dissolved in 5 parts by volume of ethyl mercaptan. While stirring and maintaining a calcium chloride moisture seal, hydrogen chloride is then passed slowly over the liquid. After 10 hours, the solution is evaporated in vacuum, the residue taken up in ether, the ethereal solution washed with dilute sodium carbonate solution and water, dried and evaporated. The thus-obtained crude oily 3,21-dihydroxy-12-acetoxy-pregnane-20-one diethyl-thioacetal of the formula

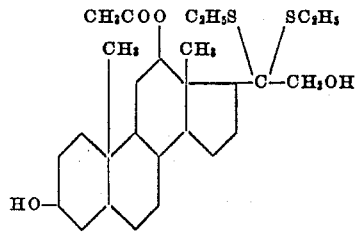

can be purified by chromatography over aluminum oxide (preferably after acetylation) or may be further used as the crude product.

5 parts of the pure 3,21-dihydroxy-12-acetoxy-pregnane-20-one-diethyl-thioacetal are heated for 2 hours on the water-bath with 10 parts of mercuric chloride in 20 parts by volume of pyridine and 40 parts by volume of acetic anhydride. The solution is evaporated to dryness in vacuum with addition of water, and the residue is taken up in ether. The ethereal solution is washed with dilute hydrochloric acid and water, and is then dried and evaporated. The crude thioenol ether, obtained as residue, is chromatographed over aluminum oxide. The evaporated pentane and benzene fractions are then recrystallized from pentane and give the characteristic prisms of 3,12,21-triacetoxy-pregnane-20-one-thioenol ethyl ether, melting at 155–160° and corresponding to the formula

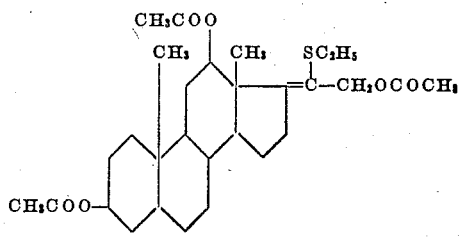

This thioenol ether and also its amorphous mother liquors give, in solution in a small quantity of chloroform, a brown coloration with tetranitromethane. According to the above described procedure it is possible to convert other acylic thioacetals of 20-oxo-pregnanes or 20-oxo-pregnanes, for example, Δ⁵-3,21-diacetoxy-pregnene-20-one-dibutyl-thioacetal or 3,21-dioxy-12-acetoxy-pregnane-20-one-dimethyl-thioacetal into the corresponding 20-thioenol ethers.

Having thus disclosed the invention, what is claimed is:

1. A thioenol lower alkyl ether selected from the group consisting of the thioenol lower alkyl ethers of the 20-oxo-pregnanes and 20-oxo-pregnenes, which are substituted in the 21-position by a member selected from the group consisting of a free hydroxyl group and a hydroxyl group esterified with a lower alkanoic acid.

2. Thioenol lower alkyl ethers of Δ⁵-20-oxo-pregnenes, which are substituted in the 21-position by a member selected from the group consisting of a free hydroxyl group and a hydroxyl group esterified with a lower alkanoic acid.

3. Thioenol lower alkyl ethers of 20-oxo-pregnanes, which are substituted in the 12-position by a hydroxyl group esterified with a lower alkanoic acid and in the 21-position by a member selected from the group consisting of a free hydroxyl group and a hydroxyl group esterified with a lower alkanoic acid.

4. The $\Delta^5$-3,21-diacetoxy-pregnene-20-one thioenol ethyl ether.

5. The $\Delta^5$-3,21-diacetoxy-pregnene-20-one thioenol benzyl ether.

6. The 3,21-dihydroxy-12-acetoxy-pregnane-20-one thioenol ethyl ether.

ALBERT WETTSTEIN.
CHARLES MEYSTRE.

No references cited.